United States Patent [19]
Schwiegelshohn

[11] Patent Number: 5,687,375
[45] Date of Patent: Nov. 11, 1997

[54] DEBUGGING OF HIGH PERFORMANCE FORTRAN PROGRAMS WITH BACKUP BREAKPOINTS

[75] Inventor: Uwe Schwiegelshohn, Dortmund, Germany

[73] Assignee: International Business Machines Corporation, Armonk, N.Y.

[21] Appl. No.: 323,415

[22] Filed: Oct. 14, 1994

[51] Int. Cl.⁶ ........................................... G06F 11/00
[52] U.S. Cl. ............... 395/704; 395/183.11; 395/183.14
[58] Field of Search ................. 395/183.11, 183.14, 395/700, 704

[56] References Cited

U.S. PATENT DOCUMENTS

| | | | |
|---|---|---|---|
| 3,937,938 | 2/1976 | Matthews | 235/153 |
| 4,080,650 | 3/1978 | Beckett | 364/200 |
| 4,819,233 | 4/1989 | Delucia et al. | 371/19 |
| 4,866,665 | 9/1989 | Haswell-Smith | 364/900 |
| 5,048,018 | 9/1991 | Bernstein et al. | 371/19 |
| 5,050,168 | 9/1991 | Paterson | 371/19 |
| 5,093,914 | 3/1992 | Coplien | 395/700 |
| 5,127,103 | 6/1992 | Hill et al. | 395/575 |
| 5,165,036 | 11/1992 | Miyata et al. | 395/800 |
| 5,193,187 | 3/1993 | Stout, II et al. | 395/650 |
| 5,249,278 | 9/1993 | Krauskopf | 394/400 |
| 5,438,574 | 8/1995 | Taniguchi | 395/183.14 |

*Primary Examiner*—Kevin A. Kriess
*Assistant Examiner*—Kakali Chaki
*Attorney, Agent, or Firm*—Robert P. Tassinari, Jr.; Ronald L. Drumheller

[57] ABSTRACT

This invention is a debugger for HPF-like languages which can be implemented on top of basically any debugger. A primary feature of the debugger is the use of backup breakpoints to generate a program status which is similar to a program status in a sequential execution of the code and the back and forth mapping between processor variables. This debugger requires some new debugging information which must be provided by the compiler. It then allows debugging from a sequential point of view.

6 Claims, 4 Drawing Sheets

```
              DO 100 I=1,N
              ............
              IF (FLAG_A(I))
                IF (FLAG_B(I))
First Breakpoint  ─────────►  ............
                  A(I) = C(I)
              ............
              ELSE
              ............
                  A(I) = D(I)
              ............
              ENDIF
Second Breakpoint ─────────►  ............
                  B(I) = D(I) + E(I)
              ELSE
              ............
              ENDIF
              ............
          100 CONTINUE
Backup Breakpoint ─────────►  ............
```

FIG. 1

```
         DO 100 I=1,N
         ..........
Breakpoint ──────────▶ IF (FLAG(I))
            A(I) = B(I)
         ELSE
            A(I) = C(I)
         ENDIF
         ..........
Backup Breakpoint ──▶ 100 CONTINUE
         Q = ..........
         R = ..........
```

FIG. 2

```
                DO 100 I=1,N
                ..........
                IF (FLAG_A(I))
                   IF (FLAG_B(I))
First Breakpoint ─────▶ ..........
                      A(I) = C(I)
                   ..........
                   ELSE
                   ..........
                      A(I) = D(I)
                   ..........
                   ENDIF
Second Breakpoint ────▶ ..........
                   B(I) = D(I) + E(I)
                ELSE
                ..........
                ENDIF
                ..........
                100 CONTINUE
Backup Breakpoint ────▶ ..........
```

FIG. 3

```
                        DO 100 I=1,N
                        ............
                        IF (FLAG_A(I))
                            IF (FLAG_B(I))
First Breakpoint ──►        ............
                            A(I) = C(I)
                            ............
                            ELSE
                            ............
                            A(I) = D(I)
                            ............
First Backup    ──►         ENDIF
                            ............
                            B(I) = D(I) + E(I)
                        ELSE
                        ............
Second Backup   ──►     ENDIF
                        ............
Third Backup    ──►  100 CONTINUE
                        ............
```

FIG. 4

```
Sequentialization Point ──► DO 100 I=1,N
                            ............
                            IF (FLAG(I))
                                A(I) = B(I)
                            ELSE
                                A(I) = C(I)
                            ENDIF
                            ............
Exit Point           ──► 100 CONTINUE
                            ............
```

FIG. 5

Breakpoint →
```
SUBROUTINE SUB(...)
............
K = .........
............
END
```

```
PROGRAM EXAMPLE
............
DO 100 I=1,N
    ............
    IF (FLAG(I))
        ............
        CALL SUB(...)
        ............
    ENDIF
```
First Backup Breakpoint —100→ `CONTINUE`
```
    ............
    DO 200 J=1,M
        ............
        IF (FLAG(J))
            ............
            CALL SUB(...)
            ............
        ENDIF
```
Second Backup Breakpoint —200→ `CONTINUE`
```
............
END
```

DEBUGGING OF HIGH PERFORMANCE FORTRAN PROGRAMS WITH BACKUP BREAKPOINTS

FIELD OF THE INVENTION

The invention relates to the programs for massively parallel processing systems, and more particularly to a method for debugging such programs.

BACKGROUND OF THE INVENTION

The increasing availability of massively parallel processor systems has led to a demand for an easy to use high level programming language that efficiently employs hardware resources without requiring the user to have profound knowledge of the underlying architecture and its communication subsystem. High Performance Fortran (HPF) has been proposed as a first representative of this kind of language. These languages are characterized by supporting a programming style which is very close to the style used in conventional sequential languages but which also allows the programmer to provide directives for an efficient automatic parallelization of the code. Thus, programmers are able to generate a parallel program without being an expert in parallel programming. Moreover, highly optimized parallel code can also be written with these languages by using the constructs of so called extrinsic routines. Therefore, even an expert parallel programmer may prefer the use of such a language by providing a direct parallel code for the performance of critical parts of his application while allowing the framework to be parallelized automatically to save time and effort without sacrificing the performance of his code.

As with most high level programming languages these languages also require a suitable programming environment of which a debugger is a vital part. Although it is possible in principle to run the resulting parallel code sequentially on a uniprocessor (as the number of processors is usually a run time parameter) there are significant problems in debugging the code by simply using a conventional uniprocessor debugger:

1. Parallel constructs are usually ignored in sequential execution, making it very difficult, if not impossible, to recognize programming errors in these constructs.
2. Some programming errors show up only when the input set (e.g. matrix dimensions) has reached a certain size. However, this size may make it impossible to run and debug the program on a sequential computer in reasonable time.
3. The use of extrinsic routines is severely restricted, if not impossible, in sequential execution mode.

Thus, a sequential debugger cannot replace a parallel debugger in general.

SUMMARY OF THE INVENTION

The invention is a method for supporting error detection in high level parallel code. It is further assumed that the SPMD (single program multiple data) approach is used. Using this approach, the high level parallel source code is transformed by the parallel compiler into a single object code which is then executed by a plurality of processors. It should also be noted that this method can be extended to the case where more than a single object code exists. The method comprises the steps of defining a breakpoint in the parallel source code, and translating the breakpoint into a corresponding breakpoint in the object code for each process, each corresponding breakpoint standing in a defined relationship to one another. A backup breakpoint is introduced into the object code at a nearest location after the breakpoint which will be guaranteed to be encountered by any processor if a single processor is stopped at the original breakpoint. The following iterative steps are performed: executing the object code until the breakpoint or the backup breakpoint is encountered; pausing execution of the process; waiting until all processes are stopped at the breakpoint or the backup breakpoint; detecting whether all processes are stopped at backup breakpoints and automatic continuation of program execution in this case; displaying of program data on user request. Finally, on user request, execution of the object code is resumed until a next breakpoint or a next backup breakpoint is encountered.

FIGURES

FIG. 1 depicts a loop having a backup breakpoint.

FIG. 2 depicts a portion of code having a plurality of breakpoints and a backup breakpoint.

FIG. 3 depicts a portion of code having a plurality of backup breakpoints.

FIG. 4 depicts sequentialization and exit points in a loop.

FIG. 5 depicts a portion of code having a breakpoint inside a procedure and a plurality of backup breakpoints outside of the procedure.

DETAILED DESCRIPTION

1. Debugging System

Figure 6:
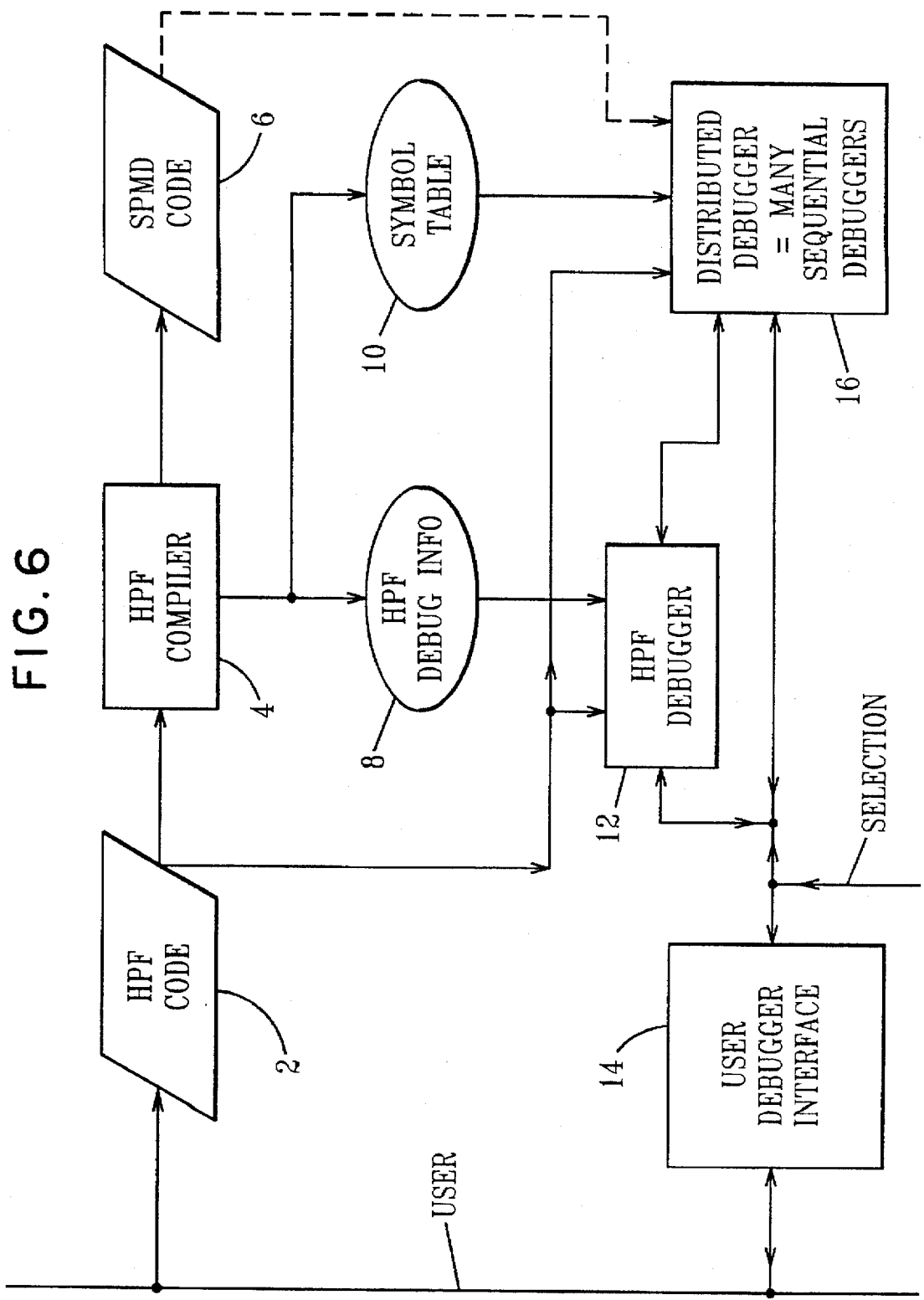
FIG. 6 depicts a block diagram of a system in accordance with the invention.

Usually, an HPF compiler translates HPF code into SPMD (single program multiple data) code, which code is then executed by all processors. As the control flow of the process code may be determined by data, this control flow may not be the same for all processes.

The main activities in code debugging are the execution of code in small blocks and the repeated extraction and sometimes modification of data. This kind of block-wise code execution is achieved by the use of breakpoints. This requires a mapping between the lines of the original program and the code executed by the processor, such that the user knows which operations have been executed up to this point in the program. One of the main problems of debugging HPF code is the change of the order of the original code by the parallel execution.

The HPF debugger of the present invention is implemented on top of conventional sequential debuggers which are connected to each of the processes on a one-to-one basis. The disclosed HPF debugger accepts user commands, translates them into sequential debugger commands and issues them selectively. It then receives the resulting data from the sequential debuggers, evaluates the data and generates information for the user. Thus, the user only interacts with the HPF debugger. However, it is also possible for the user to bypass the HPF debugger and to interact with all or some of the processes directly via the sequential debuggers, which is useful in the case of MIMD (multiple instruction multiple data)code (extrinsic routines).

Therefore, the debug information provided by the compiler can be divided into conventional debug information, which is provided to the sequential process debuggers, and parallel debug information, which is used by the HPF debugger.

2. Breakpoints

The debugging approach presented in this invention requires that all processes are stopped before the user can obtain more information about the program status. This is done because the user has little or no control over the assignment of specific data to specific processes. Consequently, each user defined breakpoint in an HPF program must be translated into one or more breakpoints for each process.

Moreover, the breakpoints in the code of the various processes must stand in a defined relation to each other. The following two scenarios are distinguished:

1. All processes are subject to an identical control flow.
2. The processes are potentially executing different program parts.

The HPF debugger will verify after each stop of the program (i.e., breakpoint) that the subsequently defined relationship between the stopping points of the processes is valid. If this is not the case, the control is handed over to the lower level debugger, where each processor can be evaluated separately. From there the user can inquire about the reason for this situation. He may also force to selectively continue the program on the various processes until again a program status is achieved which allows the use of the HPF parallel debugger.

The first case may occur in case of replicated code where each process is executing the same code with the same data or in the case of purely data-parallel code, where each process is executing the same instruction with different data. In both cases it is possible to translate the breakpoint in the high level source code into a single breakpoint in the process object code. As all processes are subject to the same control flow, it is also guaranteed that if one process hits its local breakpoint then all other processes will also eventually hit their local breakpoints.

In the second case some processes may execute a specific instruction, while others bypass it. An example for such a case is shown in the loop of FIG. 1. There it is assumed that the various iterations of the loop are executed by different processes. Therefore, it depends on the data whether the breakpoint is hit by an individual process or not. The problem is solved by introducing a "backup" breakpoint which must be hit by each process that missed the original breakpoint. An example of a breakpoint and backup breakpoint is also given in FIG. 1.

It cannot always be determined at the time when the breakpoint is set which of the processes will hit the original breakpoint. Therefore, the original breakpoint and the backup breakpoint are set on all processes. In some cases, this may lead to situations where only backup breakpoints are hit by a particular process. In this case the debugger evaluates the situation and automatically continues the execution of the program.

It is apparent that there are usually many positions where the backup breakpoint of an original breakpoint can be placed. In accordance with the present invention, it is preferred to position a single backup breakpoint at the earliest instruction after the original breakpoint which is guaranteed to be executed by all processes if one process is hitting the original breakpoint.

The reason for this rule becomes clear with FIG. 1. If the backup breakpoint is set at the instruction modifying R (R= . . . ), then the user is not able to select the instruction modifying Q (Q= . . . ) to be the position of a new original breakpoint set after the program hit the first breakpoint. In this case some processes (those that did not hit the original breakpoint) are already past (Q= . . . ) and stopped at (R= . . . ).

Unfortunately, even this rule cannot completely prevent problems, as demonstrated in FIG. 2. There, setting the second breakpoint after the first one has been hit can have undesired consequences, as some processes might have already executed the instruction modifying B(I) and are now stopped at the backup breakpoint. The reason for this problem is based on the request to select a single backup breakpoint, i.e., an instruction which all processes must execute.

This problem can be overcome as shown in FIG. 3, by allowing different backup breakpoints for a single original breakpoint if it is again assumed that all processes are executing the same code, i.e., the process code is a single program multiple data (SPMD) code. In this case, various backup breakpoints are set between the original breakpoint and the already specified single backup breakpoint. The location of these breakpoints are determined by demanding the following three conditions:

1. All locations must belong to one execution path from the original breakpoint to the single backup breakpoint.
2. In the control flow graph, each of these locations must be postdominated by the following location while it is not dominating the following location.
3. In case of a choice, the location of such an additional backup breakpoint is as soon as possible after the original breakpoint.

The use of multiple backup breakpoints for a single original breakpoint in accordance with these conditions can be seen in FIG. 3.

On user request the program will also continue from such a breakpoint. However, to make sure that no breakpoints are skipped the various breakpoints cannot be started together. The following synchronization procedure is used automatically by the HPF parallel debugger. It should be noted that all backup breakpoints and the original breakpoint belong to a single path. Therefore, an order is given for these breakpoints where the original breakpoint is the first one. At any time all processes are started which have stopped at the first breakpoint where at least one process is stopped. This procedure continues until another original breakpoint is hit or all processes are started from the last backup breakpoint belonging to the original breakpoint.

It is also possible that a user may wish to execute a specific loop sequentially, while preferring parallel execution for the rest of the program. This is again under the assumption that the various processes are executing different iterations of the loop in parallel. This may happen for programs with large execution times where the behavior of a specific loop is of special interest. This is especially useful in case of interdependent loop iterations involving inter-iteration communication or loop-carried dependencies. Using this approach, the user is able to take advantage of two desired features:

1. Fast parallel execution of the program in general, and
2. Sequential execution of specifically interesting program parts.

This can also be achieved by using additional breakpoints called sequentialization and exit/backup breakpoints. Here, a sequentialization breakpoint of a loop is an entry statement into this loop while an exit point of a loop is a statement following an exit statement of the loop but not belonging to the loop body.

An example of a sequentialization point and an exit point of a loop is given in FIG. 4. Because it is possible that not all processes are executing at least one iteration of the loop, it is also necessary to use additional backup breakpoints outside of the loop, while no backup breakpoints are required inside the loop. In the present example, the unique exit point is a backup breakpoint. During the execution of the program all processes will either hit a sequentialization breakpoint or they will bypass the loop and hit a backup/exit breakpoint directly. The debugger will evaluate the iteration variable and determine the process which must execute the first iteration (in sequential notation). This process is the only process which automatically continues execution. After the process has completed the execution of its iteration, i.e., it is stopped at a sequentialization point or at an exit point, the next process continues its execution. This procedure is repeated until the single active process has encountered an original breakpoint or all processes are stopped at an exit point or a backup breakpoint, which means the sequential execution of the loop is completed. In the last case, parallel execution of the program is resumed automatically. Of course the user can also stop the sequential execution of the loop at any time by simply removing all sequentialization points.

It is also possible for the user to specify the areas in which he wants to examine this procedure more closely. In this case an additional breakpoint is set at the beginning of this area and only upon encountering this breakpoint by all processors the breakpoint in the procedure is activated. After all processors are stopped again at the backup breakpoint at the end of this area, the breakpoint in the procedure is deactivated again. This corresponds to a feature known as conditional breakpointing in sequential debuggers.

Also in accordance with the invention, if a breakpoint is set inside a procedure, backup breakpoints may be located outside of the procedure, as shown in FIG. 5. In this case the debugger evaluates the call chain of the program. If the procedure is called from a plurality of code locations, backup points are set such that all these procedure calls are covered.

3. Parallel Debug Information

The implementation of a HPF parallel debugger requires debugger support from the parallelizing compiler which goes beyond a conventional symbol table.

As already mentioned, it is necessary to provide a runtime variable to determine the status of a program (e.g., extrinsic routine, HPF code) once the program is stopped.

Further, it is necessary to provide a mapping from any variable of the HPF code at any program status to the local name of the copy of this variable on all processes which own or use such a copy.

It is also required to provide a mapping from an instruction of the HPF code to an instruction of the process code and back. Moreover, for each instruction of the HPF code it must be determined whether this instruction belongs to a program segment with common control flow or to a program segment where each process may potentially execute different code. In the last case the location of the backup breakpoints or sequentialization or exit points must be provided. This information is usually available during the compilation of the HPF code. Therefore, it is only a question of preserving it and making it accessible to the HPF debugger.

Referring now to FIG. 6, a system in accordance with the invention will be described.

In a preferred embodiment of the invention, the system includes:

An HPF source code which is fed into the HPF compiler and is used by the HPF debugger and the distributed debugger (for code reference purposes). Block 2.

An HPF compiler which generates SPMD object code (from block 6), HPF debug information and the conventional debug information in the form of a symbol table. Block 4.

HPF debug information which is generated by the HPF compiler and used by the HPF debugger. Block 8.

Conventional debug information which is stored in a symbol table and is generated by the HPF compiler and used by the distributed debugger. Block 10.

A user debugger interface which is either connected with the HPF debugger or with the distributed debugger, depending on the program state. Block 14.

An HPF debugger which is connected to the user debugger interface and the distributed debugger if the program is in a valid HPF state. It uses the HPF debug information to translate user commands into commands for the distributed debugger. Block 12.

A distributed debugger which receives its commands either from the HPF debugger or from the user directly via the user debugger interface. Block 16.

I claim:

1. A method to support detection of errors in high level parallel source code, wherein the parallel source code is compiled into object code and a plurality of processes each execute a copy of said object code with different data in parallel, comprising the steps of:

defining a breakpoint in the parallel source code;

translating the breakpoint into a corresponding breakpoint in each said copy of the object code, each said corresponding breakpoint standing in a defined relationship to one another;

inserting a backup breakpoint into each said copy of the object code at a nearest location after the corresponding breakpoint in said each copy that will be guaranteed to be encountered by the process executing said each copy if any one of said processes encounters one of said corresponding breakpoints while executing one of said copies and said process executing said each copy does not encounter said corresponding breakpoint in said each copy;

iteratively:

executing the copies of the object code in parallel by said processes until the corresponding breakpoint or the backup breakpoint in each said copy is encountered by the process executing said each copy;

pausing execution of said each copy by the process executing said each copy at the corresponding breakpoint or the backup breakpoint in said each copy, whichever is encountered first;

evaluating the status of all said processes and automatically resuming execution of said copies of the object code in parallel by said processes if execution of each of said copies is stopped at the backup breakpoint thereof;

allowing user interaction with the paused processes and user evaluation and modification of program status data; and resuming execution of the copies of the object code in parallel by said processes on user request until a next breakpoint or a next backup breakpoint or a code termination is encountered by each said process.

2. The method of claim 1, wherein the breakpoint is positioned within a partition of the parallel source code, and the backup breakpoint is positioned in each said copy of the object code directly after the end of a largest partition completely including this partition.

3. The method of claim 1, wherein the location of the breakpoint in a control flow graph corresponding to said parallel source code is postdominated by the location in the control flow graph that corresponds to the backup breakpoint in said each copy of the object code.

4. The method of claim 1, further comprising the steps of:

introducing one or more additional backup breakpoints into said each copy of the object code at locations between the corresponding breakpoint and the backup breakpoint thereof;

each said additional backup breakpoint being positioned directly after the end of a partition completely including the partition of the corresponding breakpoint and being completely included by the partition of the backup breakpoint; and all said additional backup breakpoints lying within an all execution path from the corresponding breakpoint to the backup breakpoint.

5. The method of claim 1, wherein the processes each comprise a procedure, and wherein the corresponding breakpoint resides in the procedure and said backup breakpoint resides outside the procedure.

6. A method for interrupting execution of a parallel program at a loop and sequentially processing the loop, comprising the steps of:

defining a sequentialization breakpoint in a loop of the parallel program, the sequentialization breakpoint demarking the beginning of a loop in the parallel program to be executed sequentially;

defining exit breakpoints immediately following each exit statement of the loop to be executed sequentially, each exit breakpoint acting as a breakpoint which interrupts processing in processes having completed the execution of an iteration of the loop to be executed sequentially; and defining a backup breakpoint at the end of the smallest partition in which the loop to be sequentialized is completely included, the backup breakpoint acting as a breakpoint which interrupts processing in processes not executing an iteration of the loop.

* * * * *